O. ZARTH.
VEHICLE WHEEL.
APPLICATION FILED JUNE 7, 1912.
1,050,506.
Patented Jan. 14, 1913.
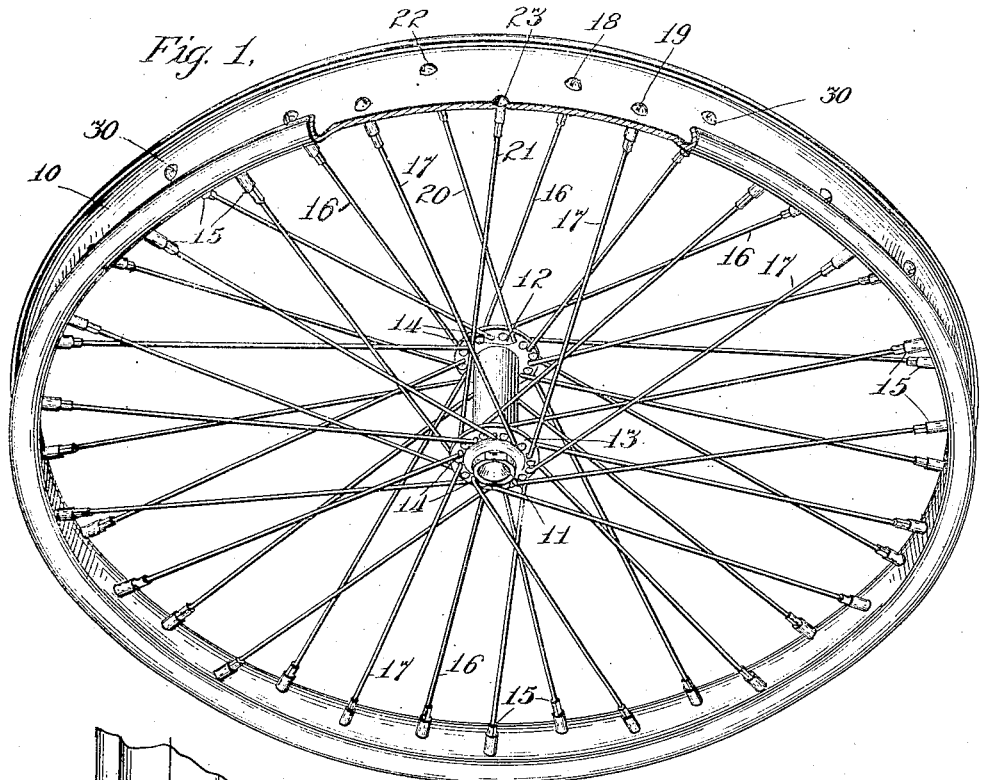
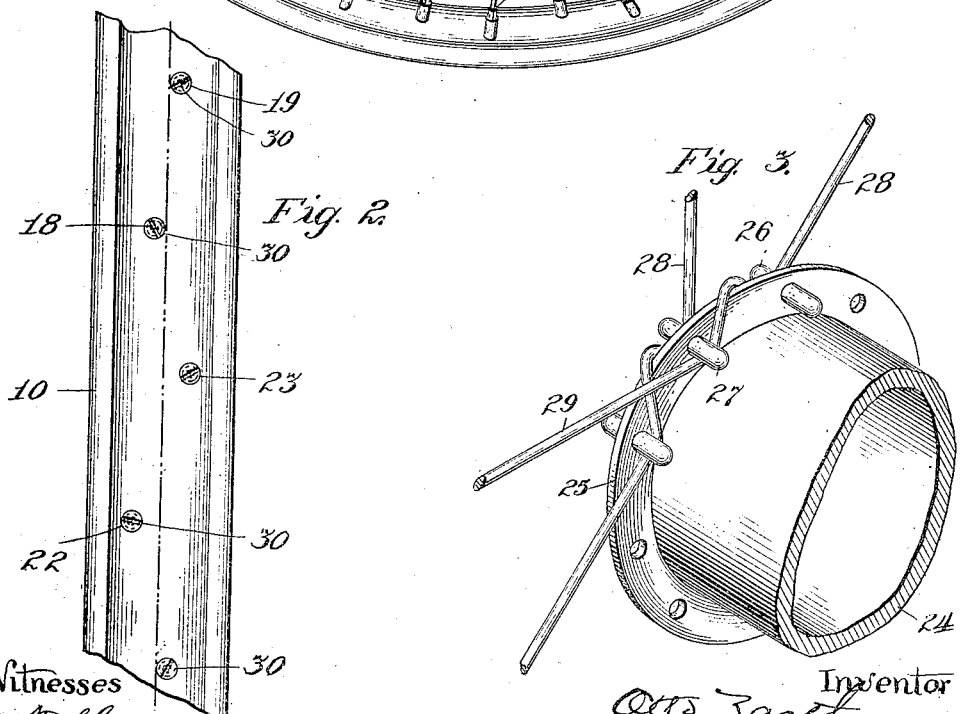

UNITED STATES PATENT OFFICE.

OTTO ZARTH, OF AURORA, ILLINOIS.

VEHICLE-WHEEL.

1,050,506.

Specification of Letters Patent. Patented Jan. 14, 1913.

Application filed June 7, 1912. Serial No. 702,238.

*To all whom it may concern:*

Be it known that I, OTTO ZARTH, a citizen of the United States, and resident of Aurora, county of Kane, and State of Illinois, have invented certain new and useful Improvements in Vehicle-Wheels, of which the following is a specification, and which are illustrated in the accompanying drawings, forming a part thereof.
The invention relates to wheels of the suspension type, such as are ordinarily used on bicycles and motor cycles, and in which the spokes are of wire or small rods, placed under tension. In wheels of this type, the hub is centered with reference to the rim by properly straining the various spokes. A common source of trouble in this type of wheels is the distortion of the rim by a twisting or warping action.
The object of the present invention is to provide means for not only properly centering the hub but for truing it and properly maintaining the form of the rim, and it consists in a wheel having its spokes so arranged with reference to the hub and the rim that certain of them serve primarily for centering the hub, while certain spokes serve primarily for truing the rim and maintaining its proper form.
The invention is illustrated in the accompanying drawings, in which—

Figure 1 is a perspective of a wheel, without its tire, shown partly in section; Fig. 2 is a detail plan view of the rim of the wheel;
and Fig. 3 is a detail in perspective of the hub, showing one form of attachment of the spokes thereto.

The rim 10 may be made of any desired material and of any desired cross-sectional form. It is shown as made of sheet metal and given a form in cross section adapted for use with the so-called clencher tire. The hub 11 may be of any desired form, having suitable means for attaching the spokes thereto. In Fig. 1 the hub is shown as cylindrical in form and having adjacent its ends radial flanges 12, 13, each flange being apertured to receive the ends of the spokes. The spokes are formed of light rods, each having its inner end inserted through an aperture in one of the hub flanges, and being then headed or upset, as shown at 14, to prevent its withdrawal from the aperture. The outer end of each spoke engages the rim through the medium of a nut, as 15, of common construction, this nut extending through the rim and being headed, as shown at 30, to form a shoulder for drawing against the outer face of the rim. These nuts may have their heads slotted, as shown, for engagement by a screwdriver, and their inner ends given a polygonal form, as shown, for engagement by a wrench.

As thus far described, the wheel presents no novel features, but has been in use on bicycles, motor cycles and other vehicles for many years.

The outer ends of the spokes are set in the rim, generally speaking, in two series, preferably each series comprising one-half of the total number of spokes. One series is attached to the rim approximately at or adjacent its circumferential median line; the other series being attached to the rim more remote from its circumferential median line, one-half of them being on one side thereof and the other half on the other side of said line. The spokes of the former series, that is to say, the spokes set in the rim adjacent its circumferential median line, are attached to the outer faces of the hub flanges, the attachment being, in the construction of Fig. 1 as described, by having the end of the rod extending through the hub flange from its outer face, the head being formed against the inner face of the flange. The spokes of the latter series, those which are attached to the rim more remotely from its circumferential median line, are attached to the inner faces of the hub flanges, their ends extending outwardly through the flange and being headed up against the outer face thereof.

Preferably none of the spokes cross the central plane of the wheel, the spokes associated with the two hub flanges not being crossed. The spokes of each of the two series named are arranged in pairs, the members of each pair being attached to different hub flanges. This arrangement of the spokes with reference to the hub and rim is shown in the drawings, one pair of the first named series being represented at 16, 17, their inner ends springing respectively from the outer faces of the flanges 12, 13, and having their outer ends attached to the rim adjacent its circumferential median line, as indicated at 18, 19.

One pair of the second named series of spokes is represented at 20, 21, their inner ends being attached, respectively, to the inner faces of the hub flanges 12, 13, and their outer ends being attached to the rim more remote from its circumferential median line and at opposite sides thereof, as represented at 22, 23.

From the described arrangement of the spokes it will be seen that those of the first named series, comprising the spokes 16, 17, are set at a greater angle with reference to the plane of the wheel than are those of the second named series, comprising the spokes 20, 21. The spokes of the series comprising the spokes 16, 17 being placed under uniform tension, not only center the hub with reference to the rim, but bring and hold the circumferential median line of each to a common plane.

The spokes of the series comprising the spokes 20, 21, being more nearly parallel with the plane of the wheel and being attached to the rim near its edges, will, when brought to uniform tension, maintain the rim in its true and symmetrical form, preventing it from twisting or warping out of shape. The particular means for attaching the spokes to the hub and to the rim are not material, it being essential only that the attachment be secure and that means be provided for straining the spokes.

In Fig. 3 there is shown a modified form of attachment of the spokes to the hub. The barrel of the hub is here represented at 24, and one of its flanges at 25. Studs, as 26, 27 are set through the hub flanges. The spokes, as 28, 29, are formed in pairs, each pair being made of a single piece of wire extending from one side of the rim to the other, and being looped around the studs in the hub flange and across the flange itself. When this construction is followed, the spoke 28 will correspond with the spoke 16, and the spoke 29 with the spoke 20, of Fig. 1.

While there is shown in the drawings a hub having but a single pair of flanges, the invention is of sufficient scope to include any construction in which the spokes are arranged in two series, one series being attached to the rim near its edges, and the other more nearly and preferably substantially at its circumferential median line.

I claim as my invention—

1. In a vehicle wheel in combination, a hub, a rim, two sets of spokes attached to the hub and rim respectively at opposite sides of the median plane of the wheel, and two sets of spokes attached to the hub respectively outside of the lines of attachment thereto of the first named sets of spokes and to the rim between the lines of attachment thereto of said first named sets of spokes.

2. In a vehicle wheel in combination, a hub, a rim, two sets of spokes attached to the hub and rim respectively at opposite sides of the median plane of the wheel, and two sets of spokes attached to the hub respectively outside of the lines of attachment thereto of the first named sets of spokes and to the rim between the lines of attachment thereto of said first named sets of spokes, the spokes being arranged in the rim in alternating pairs, the pairs consisting respectively of two spokes of the first named set and two spokes of the second named set.

3. In a vehicle wheel having tension spokes in combination, a hub having a pair of circumferential flanges, a rim, spokes arranged in four sets, two of the sets being attached respectively to the outer faces of the hub flanges and to the rim adjacent its circumferential median line, and two of the sets being attached respectively to the inner faces of the hub flanges and to the rim more remote from its circumferential median line than the points of attachment of the first named two sets of spokes.

OTTO ZARTH.

Witnesses:
EDWARD SCHMIDT,
GEORGE ERHART.